(12) United States Patent
Mulder

(10) Patent No.: US 6,856,389 B2
(45) Date of Patent: Feb. 15, 2005

(54) PORTABLE REFLEX COMPARATOR

(75) Inventor: R. Stephen Mulder, Windsor (CA)

(73) Assignee: Hallmark Technologies, Inc., Windsor (CA)

( * ) Notice: Subject to any disclaimer, the term of this patent is extended or adjusted under 35 U.S.C. 154(b) by 453 days.

(21) Appl. No.: 09/784,764

(22) Filed: Feb. 15, 2001

(65) Prior Publication Data

US 2002/0109834 A1 Aug. 15, 2002

(51) Int. Cl.[7] .............................................. G01N 21/00
(52) U.S. Cl. .................................................. 356/237.1
(58) Field of Search ....................... 356/237.1, 445–448, 356/213–226, 239.2, 239.8, 237.2, 237.6

(56) References Cited

U.S. PATENT DOCUMENTS 4,022,532 A * 5/1977 Montagnino ................ 356/513
4,097,751 A * 6/1978 Egan et al. ............. 250/559.01

FOREIGN PATENT DOCUMENTS

JP          07-107346     *  4/1995

* cited by examiner

*Primary Examiner*—Tu T. Nguyen
(74) *Attorney, Agent, or Firm*—Harness, Dickey & Pierce P.L.C.

(57) ABSTRACT

A portable testing device for comparing one reflective part with another to determine whether the reflective part has met quality standards is presented. The portable reflex comparator includes a light source for directing a beam of light to a lock-in amplifier and to a collimating lens. The collimating lens directs light to a reflex part to be tested, for example, one being manufactured by an injection molding machine to be used as an automotive lens. A light beam is reflected back out of the reflective part, through the collimating lens where it converges to the focal plane where it is processed by the amplifier. A voltmeter produces a reading for the operator to see whether the production part meets a certain standardized value.

14 Claims, 3 Drawing Sheets

PORTABLE REFLEX COMPARATOR

FIELD OF THE INVENTION

The present invention relates generally to a testing device for comparing one reflective part with another, and more particularly, to a portable reflex comparator that can be used by a technician on a mold line to conduct quality checks of newly molded reflex parts, such as those used in tail lamps and headlamps for automobiles.

BACKGROUND AND SUMMARY OF THE INVENTION

It is often necessary to test production run parts on an on-going basis in order to assure quality standards have been met. When manufacturing plastic reflex parts, it is important to test the reflecting quality of the resulting part in order to make sure that it performs appropriately when installed in the vehicle. Traditionally, production run reflex parts were not tested on a regular basis because product samples would have to be sent to an off-site laboratory for testing. These off-site laboratories generally utilize a 100-foot long by 15-foot by 15-foot light tunnel that is located in a light-controlled chamber. Such conventional light tunnels require special equipment that is large in size and require skilled personnel to operate. These types of light-controlled testing chambers are costly to set up and maintain and require complete darkness to operate. Other problems with utilizing traditional light-tunnels is the unacceptable turn-around time in providing feedback information to the manufacturing facility. In some instances a factory could continue to make a defective tail lamp and not be aware that it was defective because the laboratory had not yet provided the test results back to the factory. This could result in defective parts being released to production which would be costly to correct.

Thus, it is desirable to provide a portable reflex comparator that allows a machine operator to test at her workstation the reflex performance of a newly molded part.

It is further preferred to provide a portable reflex comparator that allows a machine operator to quickly and easily test a newly run part, with little intervention in the daily production routine.

It is also preferred to provide a portable reflex comparator that allows various different reflex parts to be compared in order to assure they have met quality standards.

It is also desirable to provide a reflex comparator that is lightweight, inexpensive, easy for an operator to transfer from machine station to machine station, yet provides reliable information concerning the quality of a reflex part.

Another object of the invention would be to allow reflex parts to be tested in well-lit areas and to provide a machine that is not sensitive to ambient light.

According to one aspect of the present invention, the portable reflex comparator includes a laser light source, fiberoptic members to carry light to a focal point, and a collimating lens spaced apart from the focal plane. A meter with a gain control is provided for adjusting the signal output from a lock-in amplifier, with circuitry for processing signals from the laser light source and the reflex part being tested.

According to another aspect of the present invention, a method for testing a part having light reflecting characteristics is comprised of the step of first projecting a beam of laser light through a fan for chopping the laser light so as to modulate the beam of light to about 3000 hertz. Next, fiberoptics transmit two separate modulated signals emanating from the fan. One signal is an output signal which is directed to a focal plane. The second signal is a reference signal that is directed to a detector. The output signal emanates from the focal plane and diverges to a collimating lens spaced a predetermined distance from the focal point. A parallel beam of light then emanates from the collimating lens and is directed onto the surface of the reflex part. Initially, a model or standard reflex part is inserted in the testing device and is utilized as a "model" reflex part for comparing future production run parts to the model reflex part. A light signal is then emanated back from the reflex part, through the collimating lens where it converges to an input fiber located at the focal plane. The input fiber transmits the return signal to the detector where it is processed and sent to a lock-in amplifier. The purpose of the lock-in amplifier is to filter out all noise and light unless it is modulated at the preferred 3000 hertz reference signal. This is why the reference signal is transferred directly from the fan to the detector. By this means, the system is relatively insensitive to ambient light.

From the amplifier, a signal is transmitted to a meter to provide a visual output signal equal to X. A new reflex part to be tested can now be inserted into the comparator and the above steps are repeated. If the new reflex part has a value of greater than or equal to X, then the tested part is acceptable and it passes the test. Any value less than X means the part does not measure up to the part specifications and the machine operator will know that the injection molding machine is not creating parts to specification. When this occurs the machine can be recalibrated and then new parts are tested utilizing the aforementioned steps.

DETAILED DESCRIPTION OF THE PREFERRED EMBODIMENT

Figure 1:
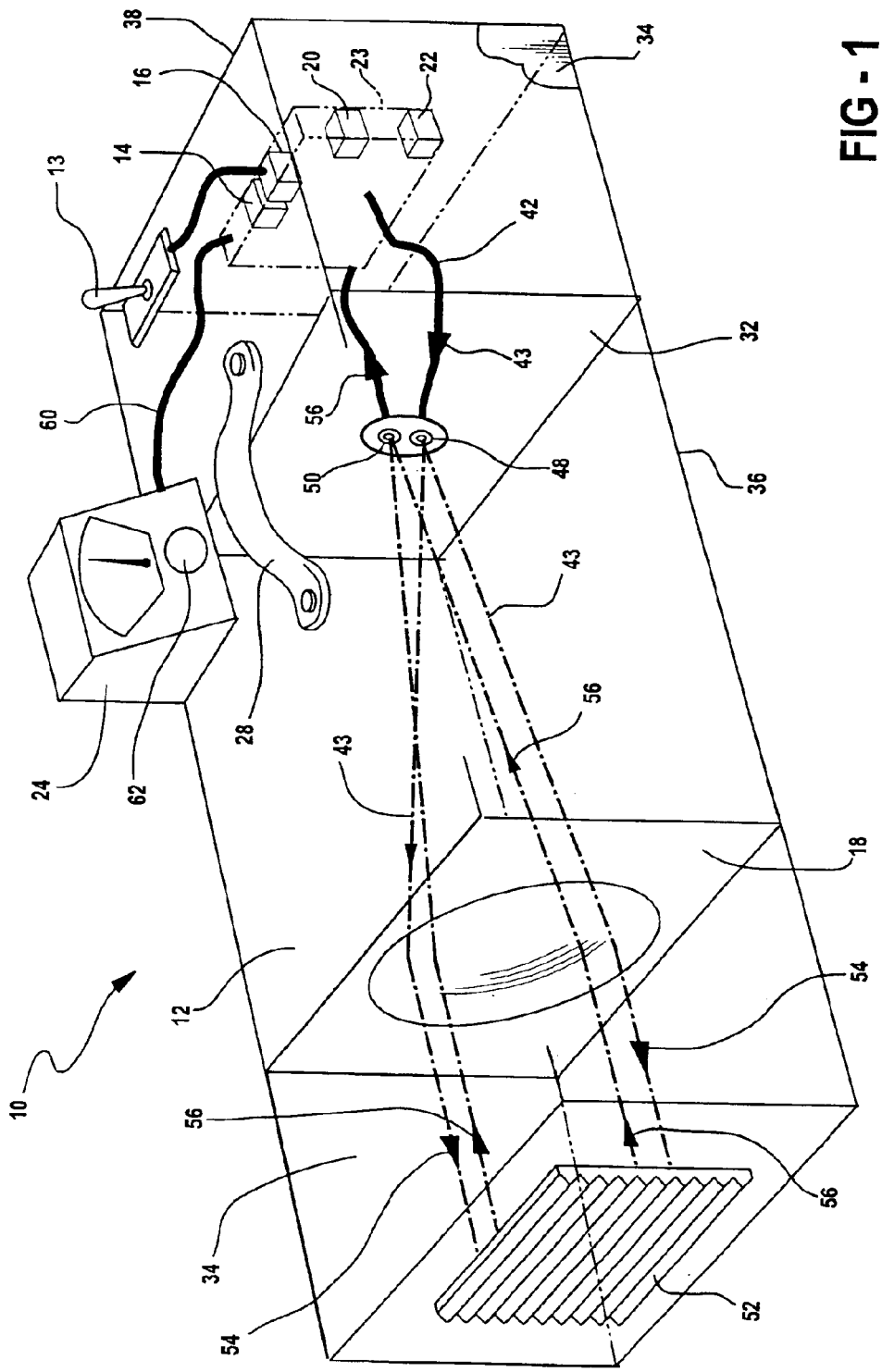
FIG. 1 is a perspective view of the portable comparator.

With reference to FIG. 1, a portable testing device for testing the quality of a reflex part, otherwise known as a portable reflex comparator 10, is shown. The comparator 10 is comprised of a housing 12, an on/off switch 13, a laser light source 14, a light modulating device such as a fan 16, a collimating lens 18, a detector 20, an amplifier 22, a meter 24, a part holder 26 and a handle 28. The reflex comparator 10 further includes fiberoptic lines 30 that connect the fan 16, a detector 20, and amplifier 22, to a focal plane 32. The light source 14, modulating device 16, detector 20 and amplifier 22 can be housed in a single unit 23 in order to consolidate the system. The reflex comparator 10 is a simplistic portable testing device that is lightweight and easily maneuvered by a machine operator from one injection molding machine to another injection molding machine.

The housing 12 is elongated in shape and includes a pair of side walls 34, a top and bottom wall 36 and a pair of end walls 38. Such walls provide structural support and an enclosure for the previously mentioned components. The housing 12 can be made of wood or composite materials as long as it has sufficient structural rigidity, but remains lightweight for ease of maneuverability. The housing is preferably 12"×12"×40" in size for ease of maneuverability but it will be appreciated that it could be other sizes. The meter 24 can be mounted to the exterior of the housing 12, as disclosed in FIG. 1. However, the meter could also be recessed within the housing 12 in order to provide a more streamlined look.

Figure 2:
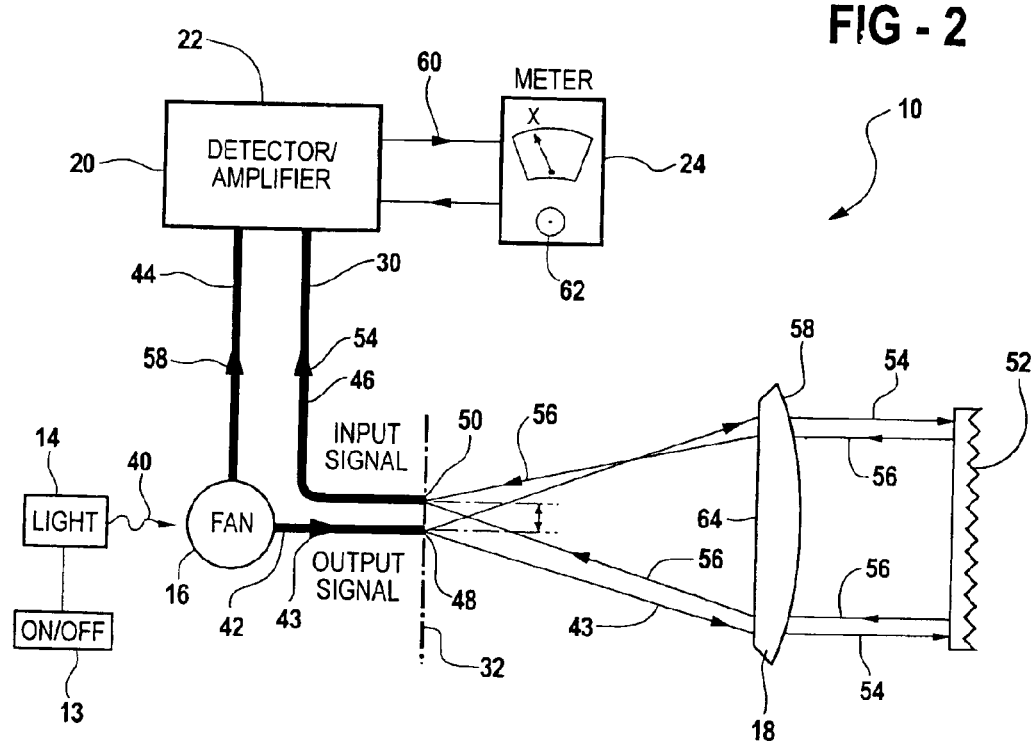
FIG. 2 is a schematic drawing of the portable reflex comparator's circuit that uses a fan modulated light source.

With reference to FIG. 2, a schematic diagram of a first preferred form of the present invention is illustrated. Specifically, here a reflex comparator 10 is illustrated having a mechanically modulated light source, or fan 16. An alternative electronic modulated light source is disclosed in FIG. 4. The laser light 14 produces a red laser light beam 40 from the laser diode within the light 14. The laser light beam 40 is directed to the surface of a rotating fan 16. The fan 16 chops the light at a preferred frequency of about 3000 hertz. The fan is secured to the interior of the housing 12 by conventional means and is spaced apart from the forward edge of the light 14 a predetermined distance. The large portion of the chopped light created by the fan 16 is then coupled to an approximately 1.5 mm in diameter fiberoptic output member 42 to the focal plane 32. The smaller portion of the chopped light is coupled to a fiberoptic reference signal member 44 which is in turn connected to the detector 20 and amplifier 22. It will be appreciated that while the detector and amplifier are shown in FIG. 2 as being a combined component, it will be appreciated that they could be separate components.

The detector and amplifier are secured to the inside surface of the side walls 34. A fiberoptic input signal member 46 forms a communication between the focal plane 32 and the detector amplifier 20, 22 for receiving an input signal 54 back from the collimating lens 18. The detector is operable to pass the reference signal 58 to the lock-in amplifier 22 which allows the amplifier to know what frequency the input signal 46 will be at.

At the focal plane 32 of the collimating lens 18, the exit end 48 of the output fiberoptic member 42 is positioned preferably 3.5 mm below the input end 50 of the fiberoptic input signal member. The diameter of the input fiberoptic member 46 is preferably 0.75 mm. With this design, an approximately 1,000 mm focal distance forms a detection angle of approximately 0.2°. The reflex part 52 that is to be compared and tested, for example, an automotive tail lamp, receives a beam of incoming light 54 which in turn is reflected from the reflex part 52 that is being sampled causing a light beam 56 to be reflected on the forward surface 58 of the collimating lens 18, which in turn directs the light beam 56 in a converging manner to the input end 50 of the fiberoptic input signal member 46. The input signal 54 is communicated to the detector 20 which in turn passes this incoming signal to the lock-in amplifier 22 where the optical and electrical noises are filtered out because it compares the reference signal 58 previously sent to the detector. This allows a clean or filtered signal 60 to exit the amplifier 22 which is then converted to a DC reading and displayed on a voltmeter 24. The voltmeter 24 has a gain control 62 to accommodate signals that range from less than 1 candlepower to several hundred candlepower. The lock-in amplifier 22 is conventional in design and is operable to extract small signals from large amounts of noise. This is accomplished by the reference signal 58 informing the lock-in amplifier's circuitry as to what frequency is to be focused on. Thus, by focusing on a certain frequency, background noise will be factored out so as to not contaminate the comparison between a model reflex part 52 that is put into the comparator, and a part to be tested during manufacturing operations.

Figure 3:
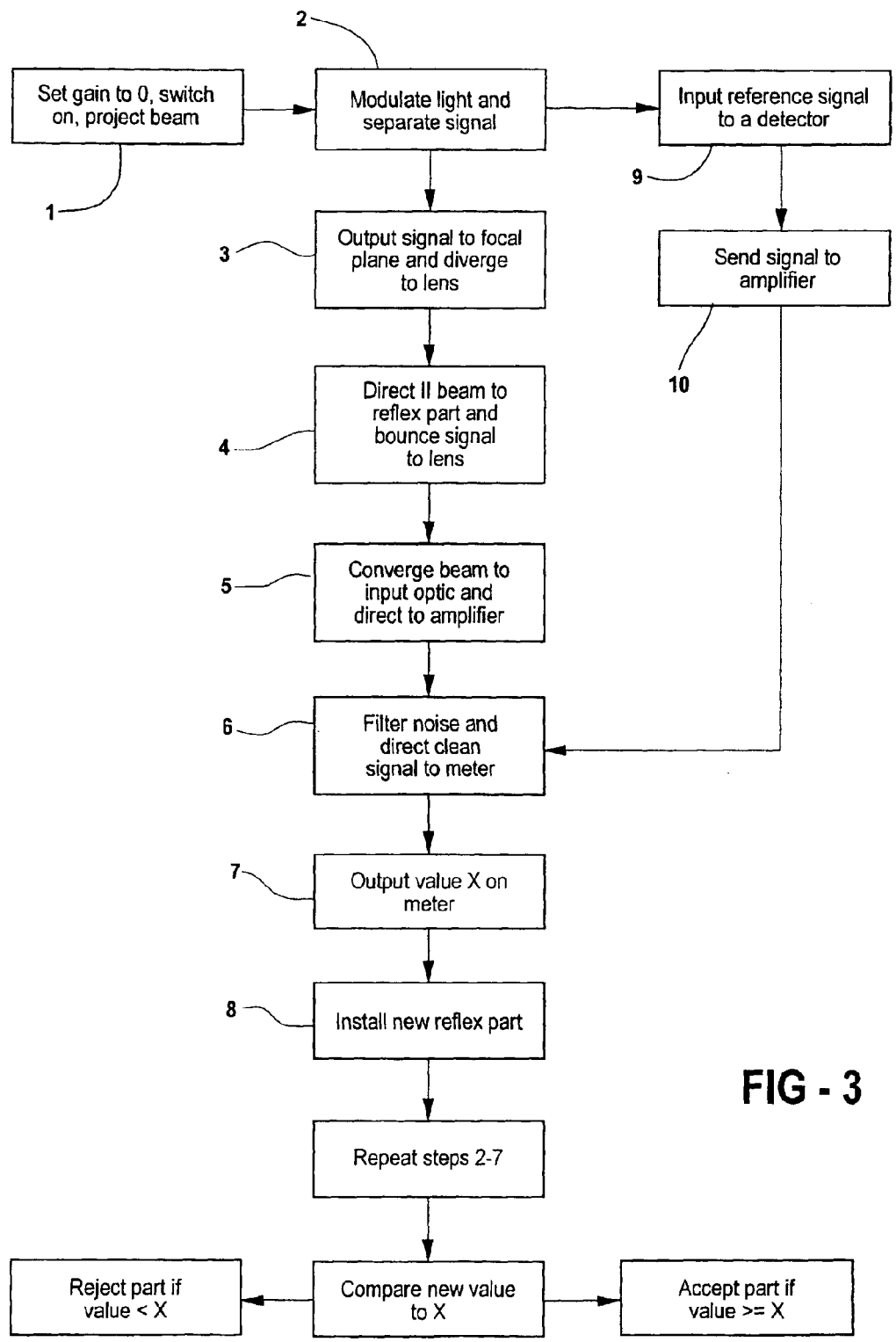
FIG. 3 is a logic diagram for the portable reflex comparator.

FIG. 3 illustrates a flow logic diagram of the method of testing a reflex part. In operation, the operator rotates the gain control 62 to the lowest setting. Next, the on/off switch 13 is turned to the on position and the reference part, that is the "model" part 52, is located within the part holder 26. The part holder is located a predetermined distance in front of the collimating lens 18. The gain control 62 is then turned up until a desired signal level is indicated on the voltmeter 24. This value, identified as X for discussion purposes, will be the target signal level that other reflex parts will be compared to in order to see if they perform equally to the model reflex part 52. The signal level X can be any desired level and will be the benchmark for production run parts. Next, the model reflex part 52 is removed from the part holder 26 and a production part to be tested is inserted in the holder. The voltmeter is then read and if the signal matches or exceeds the "benchmark" X value, then the production part has passed the comparison test. The method of testing is discussed below in greater detail.

Whenever the comparator 10 is used, it is important to first create a benchmark signal by using a model reflex part 52. It will be appreciated that because the comparator 10 is flexible, that is different reflex parts can be tested, it's important to have a model or standard part to create a base or a benchmark signal. To do this, first the operator inserts the model reflex part 52 into the holder 26. Next, the operator sets the gain to zero and turns the switch 13 to on. A laser light beam 40 is then projected to the fan which modulates at approximately 3000 hertz. The fan chops a signal into a large output signal and into a smaller reference signal. The output signal 43 diverges onto the back surface 64 of the collimating lens 18. Parallel extending beams of light 54 are directed to the surface of the reflex part 52. A light beam 56 is then reflected back from the reflex part to the forward surface of the collimating lens where it exits the collimating lens 18 and converges to the input end 50 of the input signal member 46. The incoming light signal 54 is directed to the amplifier 22 where it is compared to the reference signal 58 and the resulting filtered signal 60 is directed to the meter 24 where the benchmark value X is read.

After the model part is tested, the operator now has a standard or benchmark for future production run parts to be tested. The operator now places a new reflex part 52 into the holder 26 and the same process is repeated whereby the meter 24 outputs a new reading. If the reading equals or exceeds X, then the production part has the preferred reflective characteristics and meets quality standards. If value X is not attained, then the production part is not to specification and the machine operator can adjust the injection molding machine promptly in order to get parts back within specification. The process can be repeated as often as necessary. If a new type of reflector is to be tested, a new standard or model part is placed into the comparator 10 and the above steps are repeated. Thus, the comparators 10 and 100 can test any reflex part on the job site as production parts are being made.

Figure 4:
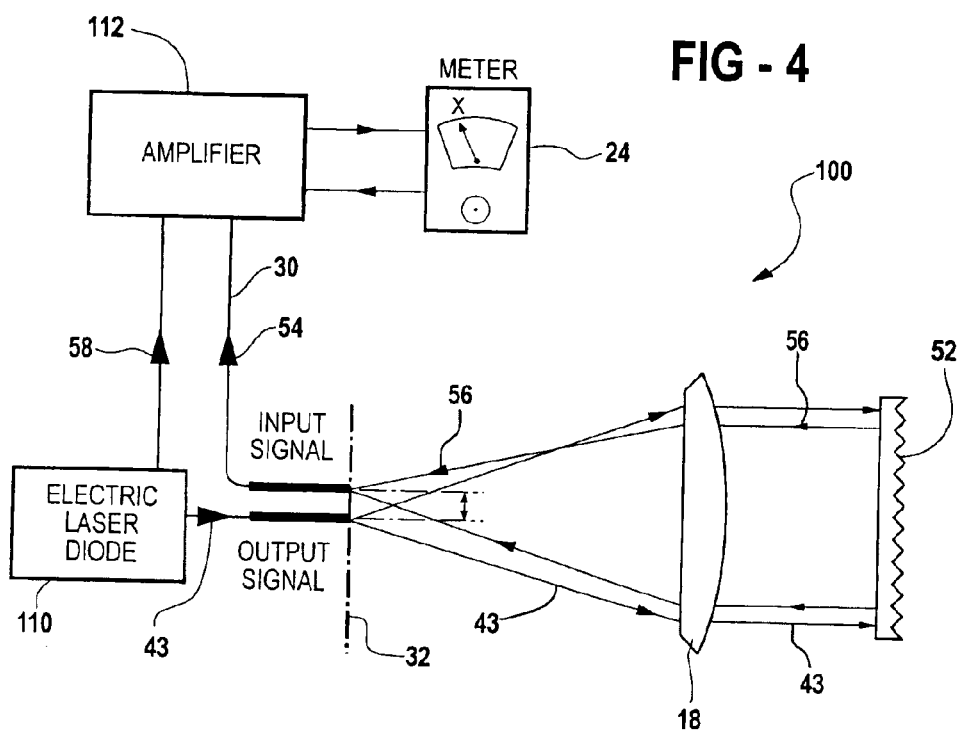
FIG. 4 is a schematic drawing of an alternative portable reflex comparator that uses an electronically modulated light source.

FIG. 4 illustrates an alternative portable reflex comparator 100 that is similar to the previously described comparator 10, but has fewer components. Where possible, like reference numerals will be used. This comparator 100 utilizes an electrically modulated laser diode 110 as the light source, a lock-in amplifier 112 and the previously discussed housing 12, meter 24, collimating lens 18, handle 28, and optics 30 which together can test a reflex part 52. The electrically modulated comparator 100, unlike the manually modulated comparator 10, is simpler in design and more lightweight and utilizes fewer components as the fan 16 is no longer used to chop the light. The laser diode 110 is operable to create a light signal at 3000 hertz. The signal produced by the laser diode 110 is split into an output signal 43 and a reference signal 58 which in turn is directed to the amplifier 112. The reference signal generated by the modulated laser diode 110 is predetermined and can be sent directly to the lock-in amplifier therefore removing the need to have a reference detector as in the prior comparator 10.

The remaining components of the comparator 100 are the same as those discussed concerning comparator 10. Further, the method of operating the comparator 100 is the same as discussed for operating comparator 10, and therefore, no further discussion will be presented here. However, it is noted that regarding the logic diagram shown in FIG. 3, the discussion concerning the fan 16 is not applicable because this component has been removed.

It will be appreciated that the reflex comparator provides only relative measurements in that it is compared to a benchmark or standard part that has been approved. Further, the comparator only compares parts of the same color. That is, whatever the benchmark part is, it must be of the same color of the reflex parts to be tested.

For the following specification taken in conjunction with the accompanying drawings, independent claims, other objects, features and advantages of the present invention will become apparent to those skilled in the art.

What is claimed is:

1. A portable reflex comparator for testing the quality of a retroreflector part comprising:
    a housing with first and second end walls, side walls, and a handle for carrying the housing;
    a light source located at one end of the housing;
    a light modulating device spaced apart from the light source;
    a focal plane offset from the light modulating device;
    a collimating lens positioned parallel to the focal plane, wherein the collimating lens is operable to receive a diverging beam of light from the focal plane, direct said beam of light substantially normal to the surface of a reflex part, receive the light beam back from the reflex part and converge the light beam to the local plane;
    a signal detector for detecting a reference signal;
    a lock-in amplifier disposed in optical communication with said signal detector for filtering out noise; and
    a meter operable in electrical communication with said amplifier and operable to output a signal indicative of the part being tested.

2. The portable reflex comparator as claimed in claim 1 further comprising a first fiber optic line extending between the detector and the focal plane, the line being operable to transmit an input signal from the lens to the detector.

3. The portable reflex comparator as claimed in claim 1 further comprising a second fiber optic line extending between the detector and the light modulating device, the line being operable to transmit a reference signal from the modulating device to the detector.

4. The portable reflex comparator as claimed in claim 1 further comprising a third fiber optic line extending between the focal plane and the light modulating device, the line being operable to transmit an output signal from the modulating device to the detector.

5. The portable reflex comparator as claimed in claim 1 further comprising a reflex part holder for holding a part that is to be tested.

6. The portable reflex comparator as claimed in claim 1, wherein the light modulating device is a fan that is operable to fragment a beam of light from the light source so as to modulate the beam of light to about 3000 hertz.

7. The portable reflex comparator as claimed in claim 1, where the light modulating device is an electronically modulated laser diode.

8. A portable reflex comparator comprising:
    a housing having a handle for carrying the comparator;
    a light modulating device located within the housing;
    a focal plane offset from the light modulating device;
    a collimating lens positioned parallel to the focal plane, wherein the collimating lens is operable to receive a diverging beam of light from the focal plane, direct said beam of light substantially normal to the surface of a reflex part, receive the light beam back from the reflex part and converge the light beam to the local plane;
    a lock-in amplifier disposed in optical communication with said collimating lens for filtering out external noise; and
    a meter disposed in electrical communication with said amplifier and operable to create a signal indicative of the part being tested.

9. The portable reflex comparator as claimed in claim 8 further comprising a detector for determining a reference signal.

10. The portable reflex comparator as claimed in claim 8 further comprising a part holder located on an end of the housing.

11. The portable reflex comparator as claimed in claim 8 wherein the light modulating device is a rotating fan.

12. The portable reflex comparator as claimed in claim 8 wherein the light modulating device is an electronically modulated laser diode.

13. A method of testing a reflex part using a comparator comprising the steps of:
    a) providing a modulated light beam signal and splitting the signal into a reference signal and an output signal;
    b) directing the output signal to a focal plane;
    c) directing the reference signal to an amplifier;
    d) diverging the output signal to a collimating lens so as to create parallel beams of light engaging the surface of a reflex part to be tested;
    e) bouncing returning beams of light onto the collimating lens and directing the returning beams to an input fiber optic member located at the focal plane to create an input signal;
    f) transmitting the input signal from the focal plane to an amplifier;
    g) processing the input signal and the reference signal so as to create a voltage output indicative of the light characteristic of the reflex part; and
    h) indicating on an output device value x which is indicative of the light characteristic of a standardized reflex part.

14. The method of testing a reflex part as claimed in claim 13 further comprising the steps of:
    i) removing the reflex part that was tested and inserting a new reflex part into the comparator;
    j) repeating steps b–g;
    k) indicating on an output device value y which is indicative of the light characteristic of the reflex part being tested from a production line;
    l) compare the standardized value x to the value y.

* * * * *